United States Patent [19]
Dorricott

[11] Patent Number: 6,101,222
[45] Date of Patent: Aug. 8, 2000

[54] SCENE CHANGE DETECTION

[75] Inventor: Martin Rex Dorricott, Basingstoke, United Kingdom

[73] Assignees: Sony Corporation, Tokyo, Japan; Sony United Kingdom Limited, Weybridge, United Kingdom

[21] Appl. No.: 08/977,585

[22] Filed: Nov. 25, 1997

[30]   Foreign Application Priority Data

Nov. 26, 1996 [GB] United Kingdom .................. 9624604

[51] Int. Cl.[7] ........................................ H04N 7/36
[52] U.S. Cl. .......................... 375/240; 348/416; 348/700
[58] Field of Search ............................ 375/240; 348/384, 348/390, 400, 401, 402, 409, 415, 416, 699, 700; 382/232, 236, 238

[56]   References Cited

U.S. PATENT DOCUMENTS

| 4,992,869 | 2/1991 | Samad ............................ 348/699 |
| 5,146,228 | 9/1992 | Irani ............................. 342/64 |
| 5,347,312 | 9/1994 | Saunders ........................ 348/699 |

FOREIGN PATENT DOCUMENTS

| 2 268 351 | 1/1994 | United Kingdom . |
| 2 281 167 | 2/1995 | United Kingdom . |

*Primary Examiner*—Bryan Tung
*Attorney, Agent, or Firm*—Frommer Lawrence & Haug, LLP.; William S. Frommer

[57]   ABSTRACT

A scene change detector sums the correlation maximum values of correlation surfaces produced by a motion vector determining circuit (2) across a current image and compares this with a threshold value (Thres) to detect scene changes. A statistical analysis of signals ($V_x$, $V_y$, Y) representing the current image may be made and a resulting value differentiated. Peaks in this differentiated value represent scene changes. Finally, rapid changes in the number of valid vectors found in a motion analysis of a current image may also be used to indicate a scene change.

6 Claims, 15 Drawing Sheets

SCENE CHANGE DETECTION

BACKGROUND OF THE INVENTION

1. Field of the Invention

This invention relates to the field of video image processing. More particularly, this invention relates to detecting scene changes within a sequence of images.

2. Description of the Prior Art

There are a variety of reasons for which one may wish to detect scene changes. An example is to generate markers within a video image library. In reality the only truly definitive scene change detection is found by the perception of a user identifying changes in the scene activity, such as subject or context changes, and marking these points. However, such a perceptual technique is not realistic for machine implementation which requires a non-perceptual basis.

FIG. 1 of the accompanying drawings illustrates adjacent image fields in differing circumstances. If the pixel values in respective corresponding positions in the two fields are subtracted from one another, then an error signal field is produced. As shown in the top pair of fields of FIG. 1, when the fields are identical, the error signal field is zero throughout. Between the middle pair of fields a scene change has occurred. In this case, the error signal field is significantly non-zero throughout a large portion. In the bottom pair of fields, the scene is the same, but considerable motion has occurred. In this case, a simple subtraction of the respective pixel values within the fields yields an error signal field with sizable non-zero areas.

In order to overcome the problem of detecting scene changes in images with considerable motion, as illustrated by the bottom two fields in FIG. 1, it is possible to use motion compensation techniques. FIG. 2 of the accompanying drawings illustrates such a technique. Motion compensated video signal processing is known (for example see British published patent application GB-A-2263602). When the motion between adjacent fields has been identified, then the later of the fields may be back projected to the time of the earlier of the fields and then the pixel values subtracted to produce an error signal that is compensated for the motion.

A problem with this technique is that a disadvantageously large amount of processing capacity is required by such motion compensated video processing systems making them complex and expensive. An object of the invention is to address this problem.

SUMMARY OF THE INVENTION

Viewed from one aspect the present invention provides apparatus for detecting a scene change in a sequence of images, said apparatus comprising:

(i) a correlation surface calculating circuit for calculating a plurality of correlation surfaces, each correlation surface representing image correlation between a search block of image data within a current image and portions of a temporally adjacent image displaced by differing displacement vectors from said search block;

(ii) a correlation maximum detecting circuit responsive to said correlation surfaces calculated by said correlation surface calculating circuit for identifying correlation maximum points within said correlation surfaces corresponding to maximum image correlation between current image and said temporally adjacent image;

(iii) an image correlation quality circuit responsive to correlation values indicative of correlation associated with said correlation maximum points for said current image for generating an image correlation quality value indicative of the degree of correlation between said current image and said temporally adjacent image; and (iv) a comparator for comparing said image correlation quality value with a predetermined threshold value to generate a scene change signal in response to said image correlation quality value being indicative of less correlation between said current image and said adjacent image than represented by said threshold value.

The present invention recognises and exploits that a considerable decrease in complexity and expense over a full motion compensated video processing system is possible when one is only interested in scene change detection. More particularly, when a correlation surface for a search block is calculated and a point of maximum correlation identified (which may be a minimum value point in the correlation surface), then the value of the correlation surface at the point of maximum correlation represents the contribution to the error signal field that would be made if the motion vector associated with that point of maximum correlation were applied to each pixel within the search block and then subtracted from the temporarily adjacent field. Thus, the sum of the values of the error signal field may be derived by summing the values of the correlation surfaces at the points of maximum correlation and then this summed value compared with a threshold level to determine whether or not there has been sufficient motion compensated change in the image content to be classified as a scene change. This technique advantageously reduces the amount of hardware required and accordingly the cost of the scene change detector.

It will be appreciated that the image correlation quality circuit may process the correlation surface values associated with the correlation maximum points in a number of different ways to produce an image correlation quality value. As mentioned above, these correlation values may be summed to produce the total of the error signal within the field. However, it is convenient to provide embodiments in which said image correlation quality circuit comprises a mean value circuit for determining a mean value of said correlation values for said correlation maximum points for said current image, said image correlation quality value being determined in dependence upon said mean value.

In order to improve the resistance of the scene change detecting technique to image noise, in preferred embodiments of the invention said image correlation quality circuit comprises a median value circuit that determines a median value of said image correlation quality values determined for a group of images surrounding said current image, said median value being subtracted from said image correlation quality value for said current image to yield a median corrected value, said median corrected value then being used as said image correlation quality value for said current image.

Noise resistance may be further improved in embodiments in which said image correlation quality circuit comprises a differentiating circuit that differentiates said image correlation quality value to yield a differentiated value, said differentiated value then being used as said image correlation quality value.

The scene change detector may be used in various ways, but is particularly suited for use to generate markers for scene changes within a video image library.

Viewed from another aspect the present invention provides a method of detecting a scene change in a sequence of images, said method comprising the steps of:

(i) calculating a plurality of correlation surfaces, each correlation surface representing image correlation between a search block of image data within a current image and portions of a temporally adjacent image displaced by differing displacement vectors from said search block;

(ii) identifying correlation maximum points within said correlation surfaces corresponding to maximum image correlation between current image and said temporally adjacent image;

(iii) in response to correlation values indicative of correlation associated with said correlation maximum points for said current image, generating an image correlation quality value indicative of the degree of correlation between said current image and said temporally adjacent image; and (iv) comparing said image correlation quality value with a predetermined threshold value to generate a scene change signal in response to said image correlation quality value being indicative of less correlation between said current image and said adjacent image than represented by said threshold value.

Viewed from a further aspect the present invention provides apparatus for detecting a scene change in a sequence of images, each pixel of an image having a plurality of signal values associated with said pixel, said apparatus comprising:

(i) a plurality of signal characteristic determining circuits, each signal characteristic determining circuit being responsive to one of said signal values representing a current image to generate a signal characteristic value for said current image;

(ii) a plurality of differentiating circuits, each differentiating circuit being responsive to rate of change between images of a respective signal characteristic value to generate a rate of characteristic change signal;

(iii) a combining circuit for combining said plurality of rate of characteristic change signals to generate an interimage characteristic change value;

(iv) a comparator for comparing said interimage characteristic change signal with a predetermined threshold value and generating a scene change signal if said interimage characteristic change signal exceeds said threshold signal.

It has been found that an advantageously simple and inexpensive scene change detector may be formed by monitoring a plurality of the signals that together represent a current image to produce a signal characteristic value representative of the signal being monitored throughout the whole of the current image, differentiating that signal value to determine its rate of change and then combining a plurality of such rate of change determinations for different signals of the current image to determine an overall value representative of the change within the current image from the previous image. This overall characteristic can then be compared with a threshold to determine whether or not a scene change has occurred.

It has been found that the characteristics of a signal that are particularly suited to monitoring in this way are the motion vectors associated with an image and the luminance value.

The statistical analysis that is performed upon such signals to provide a value representative of them throughout the entire current image have been found to be the determination of a mean and the determination of a standard deviation.

Viewed from a further aspect the invention provides a method of detecting a scene change in a sequence of images, each pixel of an image having a plurality of signal values associated with said pixel, said method comprising the steps of:

(i) generating a plurality of signal characteristic values for said current image;

(ii) in response to rate of change between images of respective signal characteristic values, generating a plurality of rate of characteristic change signals;

(iii) combining said plurality of rate of characteristic change signals to generate an interimage characteristic change value;

(iv) comparing said interimage characteristic change signal with a predetermined threshold value and generating a scene change signal if said interimage characteristic change signal exceeds said threshold signal.

Viewed from another aspect the invention provides apparatus for detecting a scene change in a sequence of images, said apparatus comprising:

(i) a correlation surface calculating circuit for calculating a plurality of correlation surfaces, each correlation surface representing image correlation between a search block of image data within a current image and portions of a temporally adjacent image displaced by differing displacement vectors from said search block;

(ii) a valid vector test circuit responsive to said plurality of correlation surfaces for determining for each correlation surface whether a ratio of a mean value of said correlation surface to a value representing maximum correlation within said correlation surface passes a valid vector threshold test;

(iii) a counter for counting a total valid vectors number of correlation surfaces within said image for which said valid vector test is passed; and (iv) a comparator for comparing said total of valid vectors number with a predetermined threshold number and generating a scene change signal if said total of valid vectors number is less than said predetermined threshold number.

A further technique that has been found able to reliably detect scene changes and yet require a relatively simple and inexpensive amount of hardware is one in which the vectors identified with the correlation surfaces are subject to a relatively straight forward validity test by comparing the correlation surface value at the correlation maximum point with the mean value of the correlation surface and then the total number of valid vectors for the current image counted and compared with a threshold value.

Viewed from a further aspect the present invention provides a method of detecting a scene change in a sequence of images, said method comprising the steps of:

(i) calculating a plurality of correlation surfaces, each correlation surface representing image correlation between a search block of image data within a current image and portions of a temporally adjacent image displaced by differing displacement vectors from said search block;

(ii) in response to said plurality of correlation surfaces, determining for each correlation surface whether a ratio of a mean value of said correlation surface to a value representing maximum correlation within said correlation surface passes a valid vector threshold test;

(iii) counting a total valid vectors number of correlation surfaces within said image for which said valid vector test is passed; and (iv) comparing said total of valid vectors number with a predetermined threshold number and generating a scene change signal if said total of valid vectors number is less than said predetermined threshold number.

BRIEF DESCRIPTION OF THE DRAWINGS

The above and other objects, features and advantages of the invention will be apparent from the following detailed description of illustrative embodiments which is to be read in connection with the accompanying drawing in which.

DESCRIPTION OF THE PREFERRED EMBODIMENTS

Figure 1:
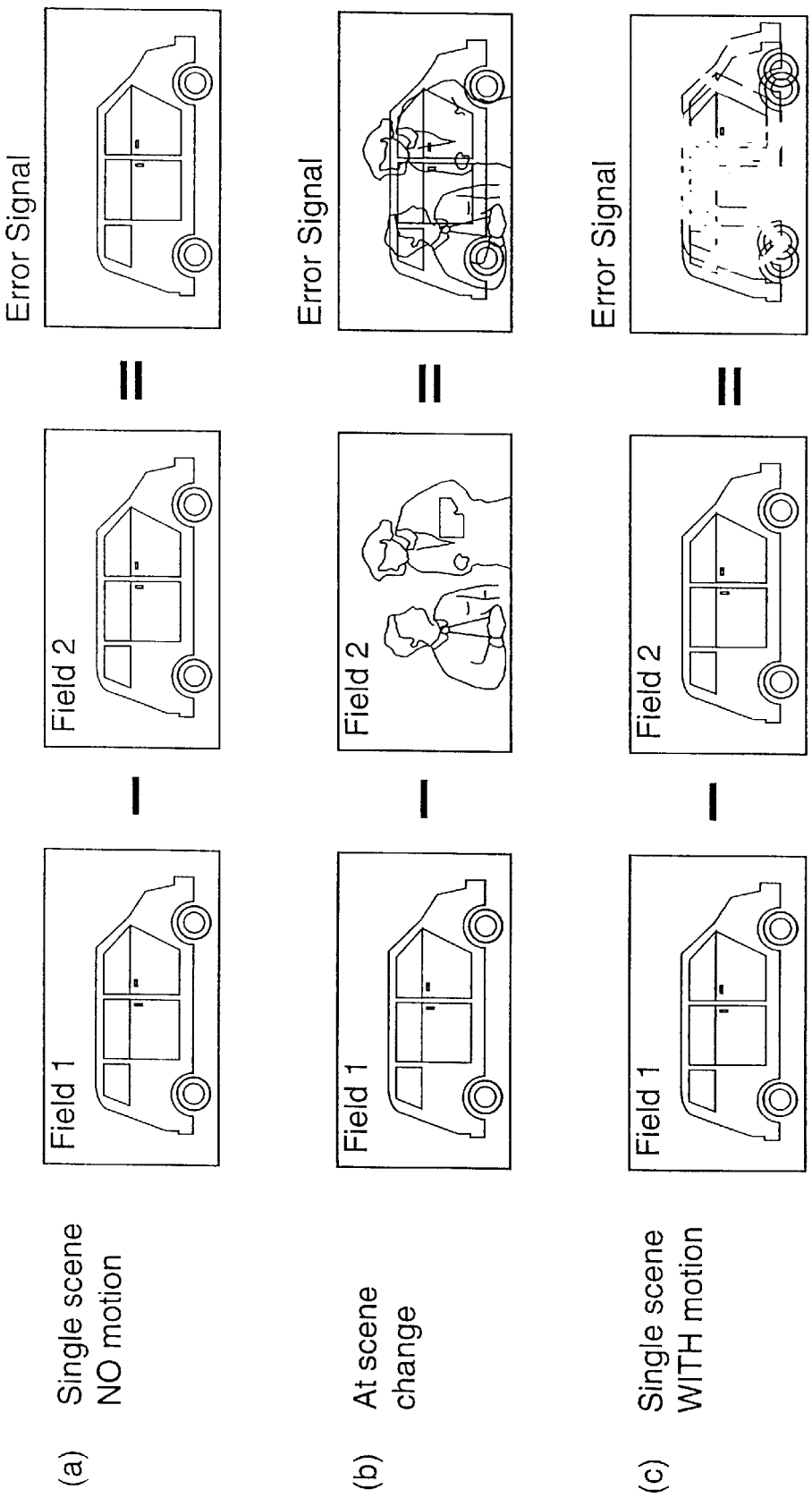
FIG. 1 illustrates various scene change scenarios.
Figure 2:
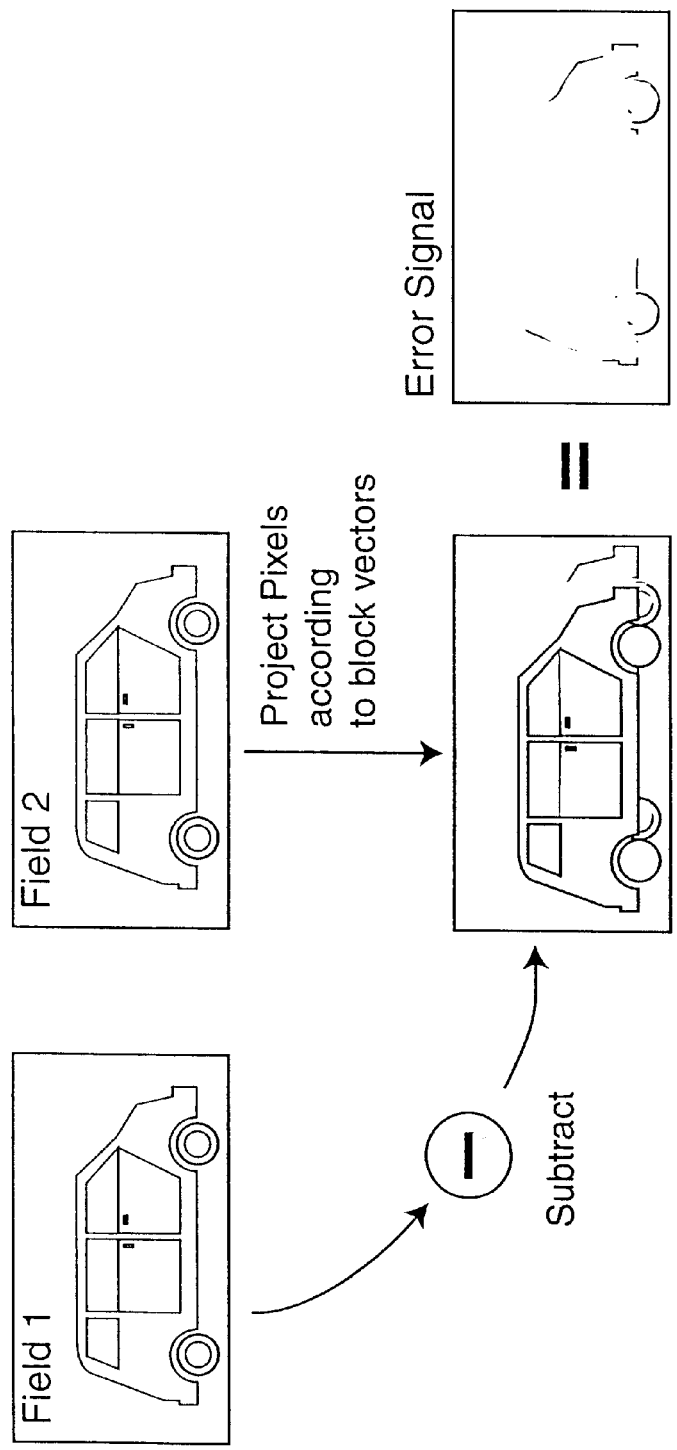
FIG. 2 illustrates motion compensation between two temporally adjacent fields and their comparison.
Figure 3:
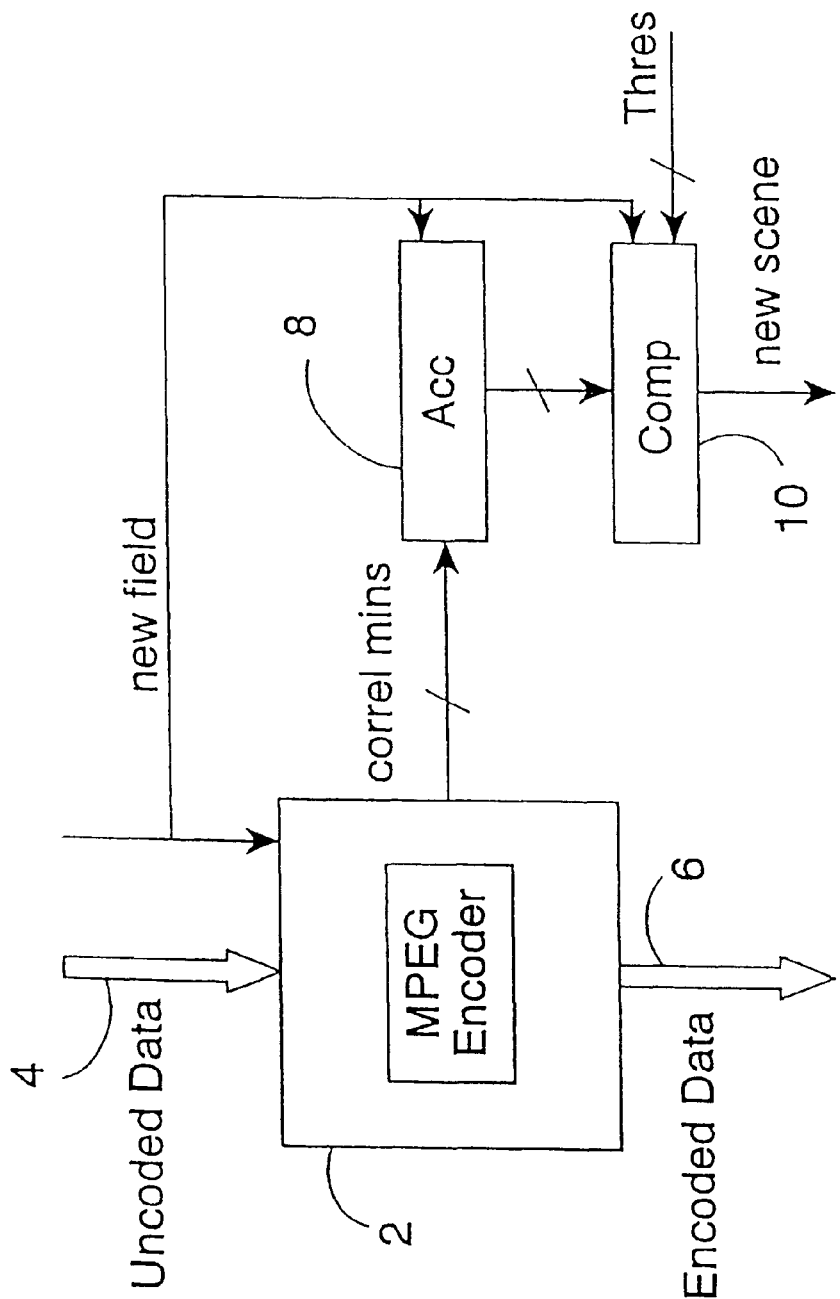
FIG. 3 illustrates a first embodiment of a scene change detector.

FIG. 3 illustrates an embodiment of a scene change detector based upon the principle of accumulating the correlation surface values at points of maximum correlation across a current image. An MPEG encoder 2 in the form of an application specific integrated circuit (ASIC) is supplied uncoded input image data 4 and outputs encoded image data 6. Such MPEG encoders 2 are known and commercially available. As part of its operation, the MPEG encoder 2 determines correlation surfaces so as to be able to identify motion vectors. The MPEG encoder 2 is modified to output the values of the correlation surface at the points of maximum correlation. In this embodiment, these points are minimums in the correlation surface. The correlation minimums are supplied to an accumulator 8 which sums them across the entire current image (field or frame). The correlation surfaces are determine for a search block displaced by differing amounts. The current image is broken down into such search blocks and when all of them have been processed a new field signal is issued that triggers a comparator 10 to subtract the accumulated value in the accumulator 8 from a threshold value. If the accumulated value is greater than the threshold value (indicating poor correlation in the current image to the field to which it is being motion compensated) then a new scene signal is issued.

Figure 4:
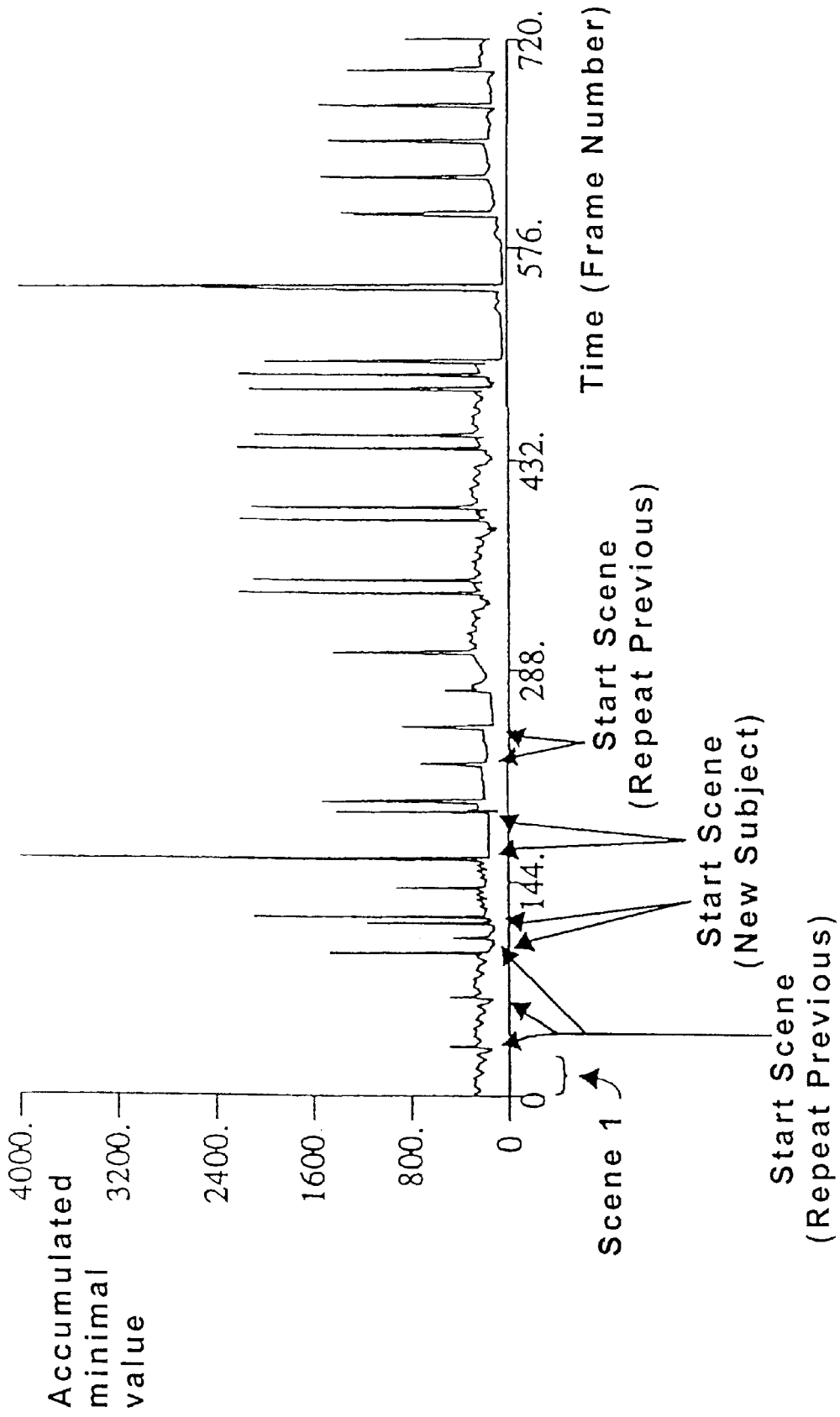
FIG. 4 illustrates the variation in accumulated minima values between frames.

FIG. 4 illustrates the results of the operation of the embodiment of FIG. 3. The accumulated correlation minima values are displayed on the vertical axis and the frame number along the horizontal axis. As can be seen, the accumulated minima value shows rapid increases in its value at various positions along the horizontal axis. These rapid increases are associated with scene changes where poor correlation between the current image and the previous image is obtained.

In using a thresholding technique such as the present technique, the degree of noise within the signal being observed is a significant, potentially performance limiting, factor. In order to reduce the amount of noise the median value determining circuit illustrated in FIG. 5 may be used. This circuit comprises a plurality of one field delay elements 12 between which the accumulated minima values are passed. Considering the current field to be field F3, this is analyzed in comparison to a group of fields including itself, the two preceding fields and the two succeeding fields. The values for this group of fields are all supplied to a median selector 14 that picks the median value from them. This median value is then supplied to a subtracter 16 which subtracts the median value from the value for the current field. The median corrected output is then supplied to the comparator 10.

Figure 6:
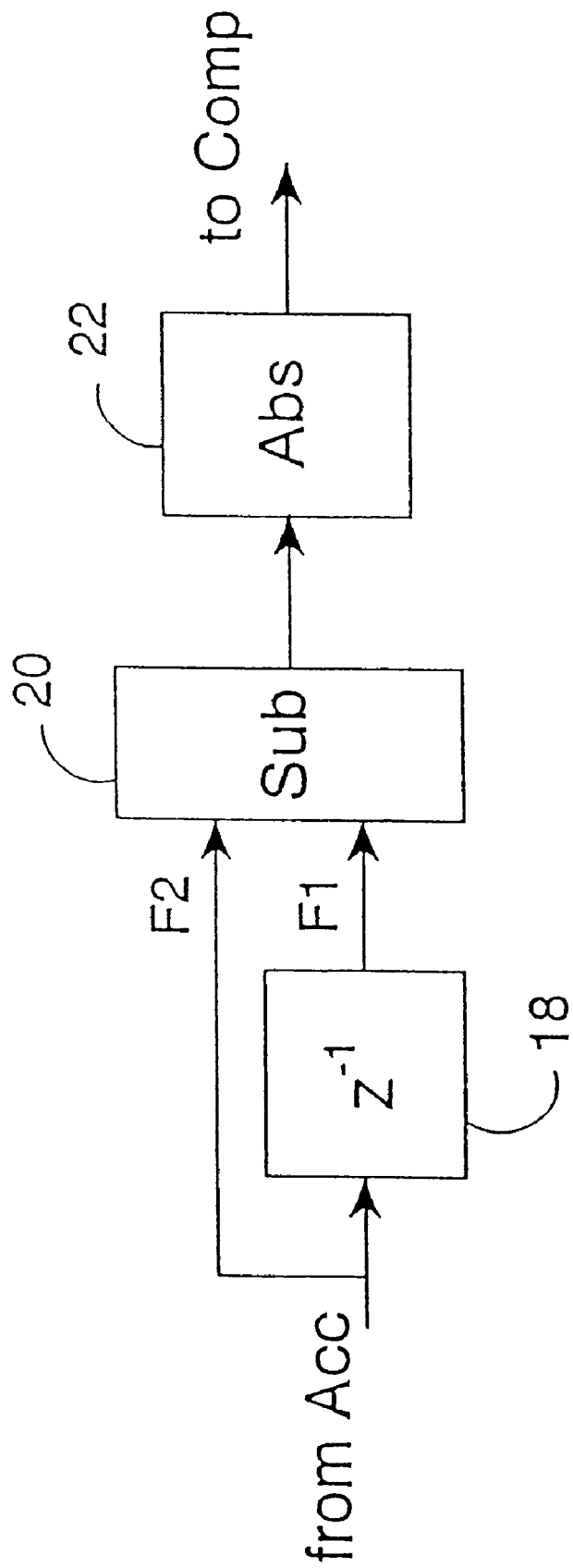
FIG. 6 illustrates a differentiation circuit.

Noise reduction may also be achieved by differentiating the value. FIG. 6 illustrates a differentiating circuit. In this circuit a one field delay element 18 receives a current field F2 at its input and outputs a previously field value F1. These values are supplied to a subtracter 20 which performs the operation F2−F1. The output of the subtracter 20 represents the rate of change of the value concerned over the time interval of one field. In order to be more useful for thresholding purposes, this differentiated signal is passed through an absolute value circuit 22 that determines its modulus irrespective of sign and then outputs this to the comparator 10.

Figure 5:
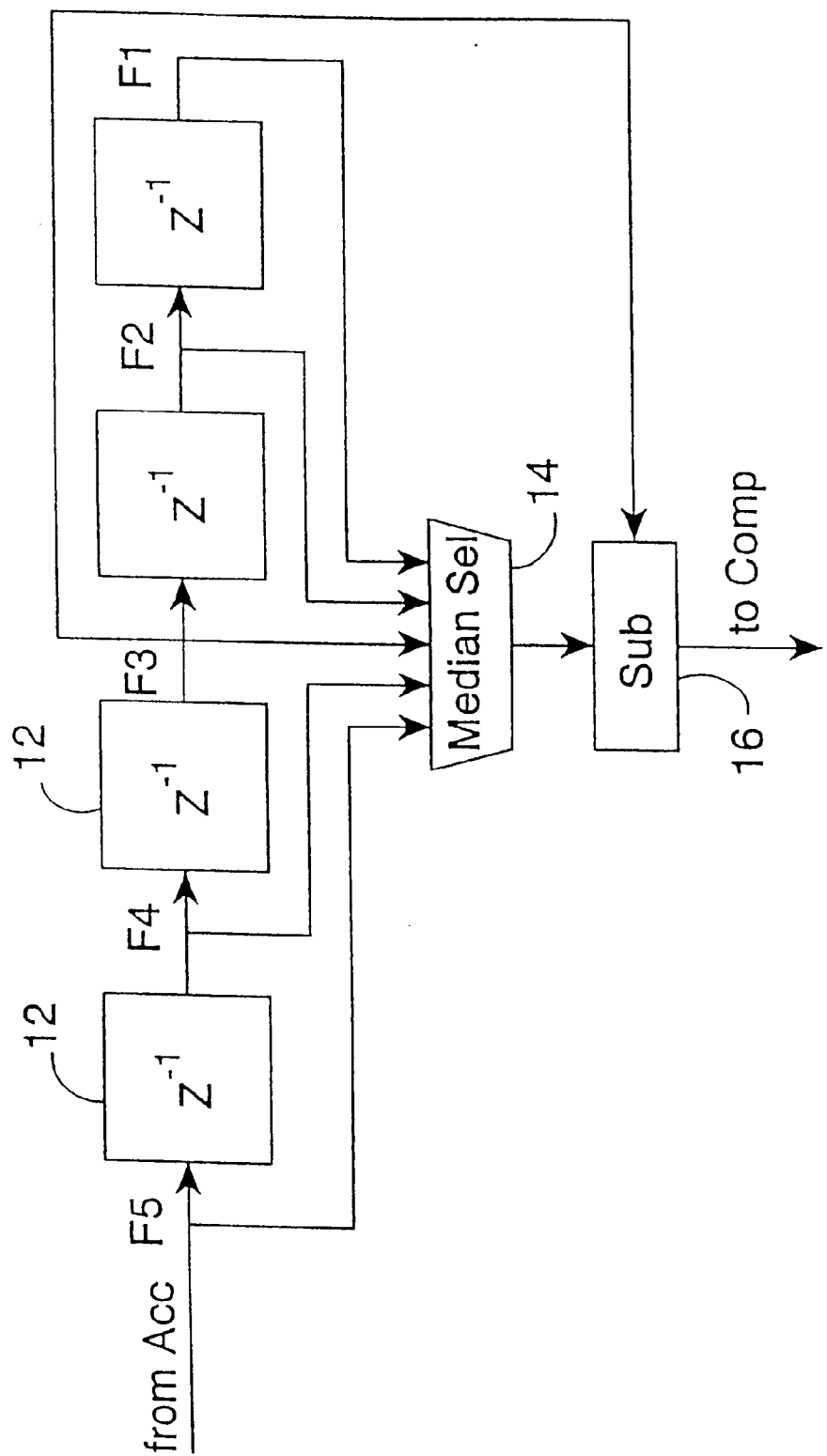
FIG. 5 illustrates a median value compensation circuit.
Figure 7:
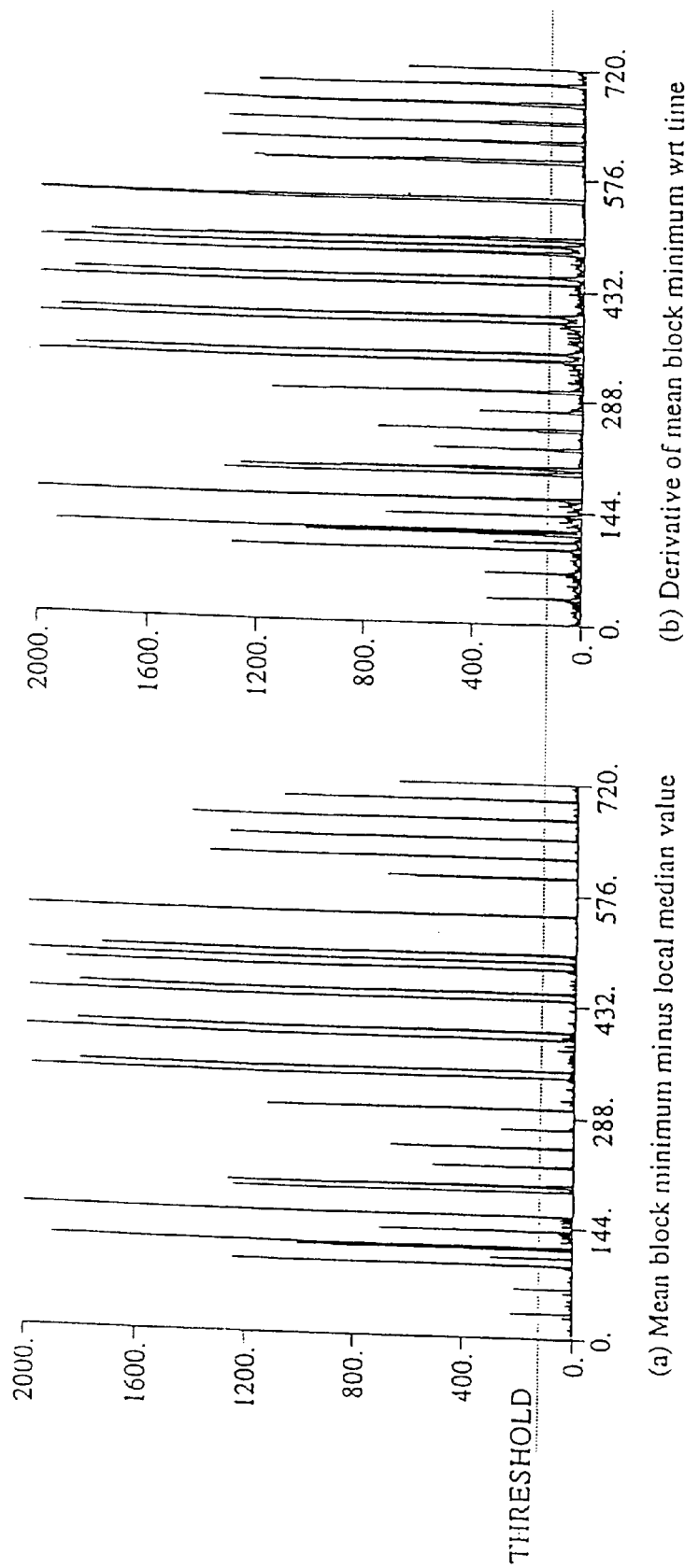
FIG. 7 illustrates results obtained using the noise reduction circuits of FIGS. 5 and 6.

FIG. 7 illustrates results obtained using the circuits of FIGS. 5 and 6. It can be seen that the base level of the signal is much reduced (i.e. the noise level is reduced) allowing the threshold for scene change detection to be made lower so enabling the scene change detector to identify more subtle scene changes than otherwise.

Figure 8:
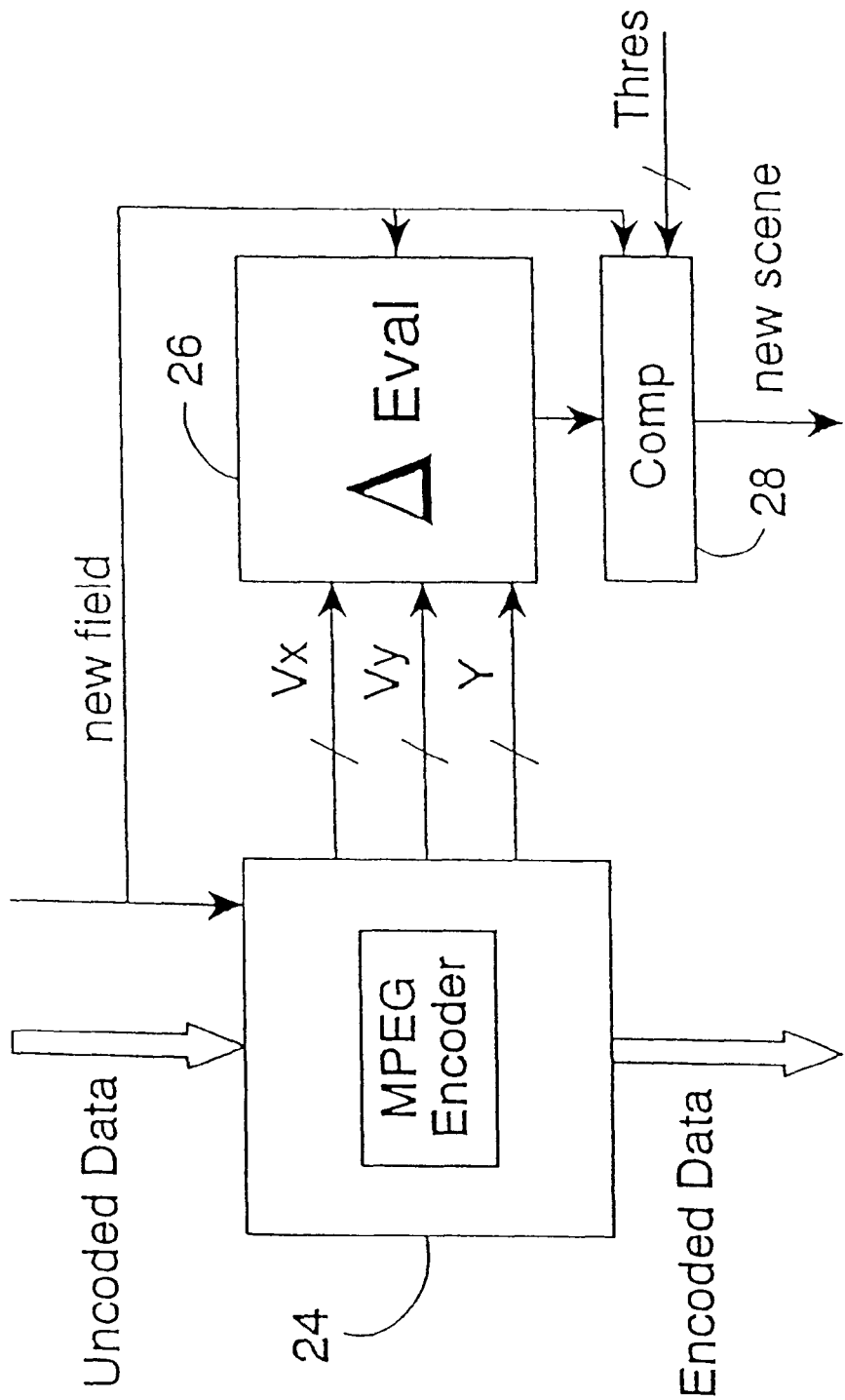
FIG. 8 illustrates a second embodiment of a scene change detector.

FIG. 8 illustrates a second embodiment of the invention. In this embodiment an MPEG encoder 24 outputs in parallel the horizontal vector components ($V_x$) and the vertical vector components ($V_y$) determined at each point within the current image together with the luminance value for that point. These values output from the MPEG encoder 24 are fed to an evaluating circuit 26 that performs a statistical type analysis upon them to produce an overall signal value characteristic of the rate of change of the nature of the current image. This output of the evaluating circuit 26 is supplied to a comparator 28 where it is subtracted from a threshold value. If the output of the evaluating circuit 26 is greater than the threshold value, then a scene change signal is issued.

Figure 9:
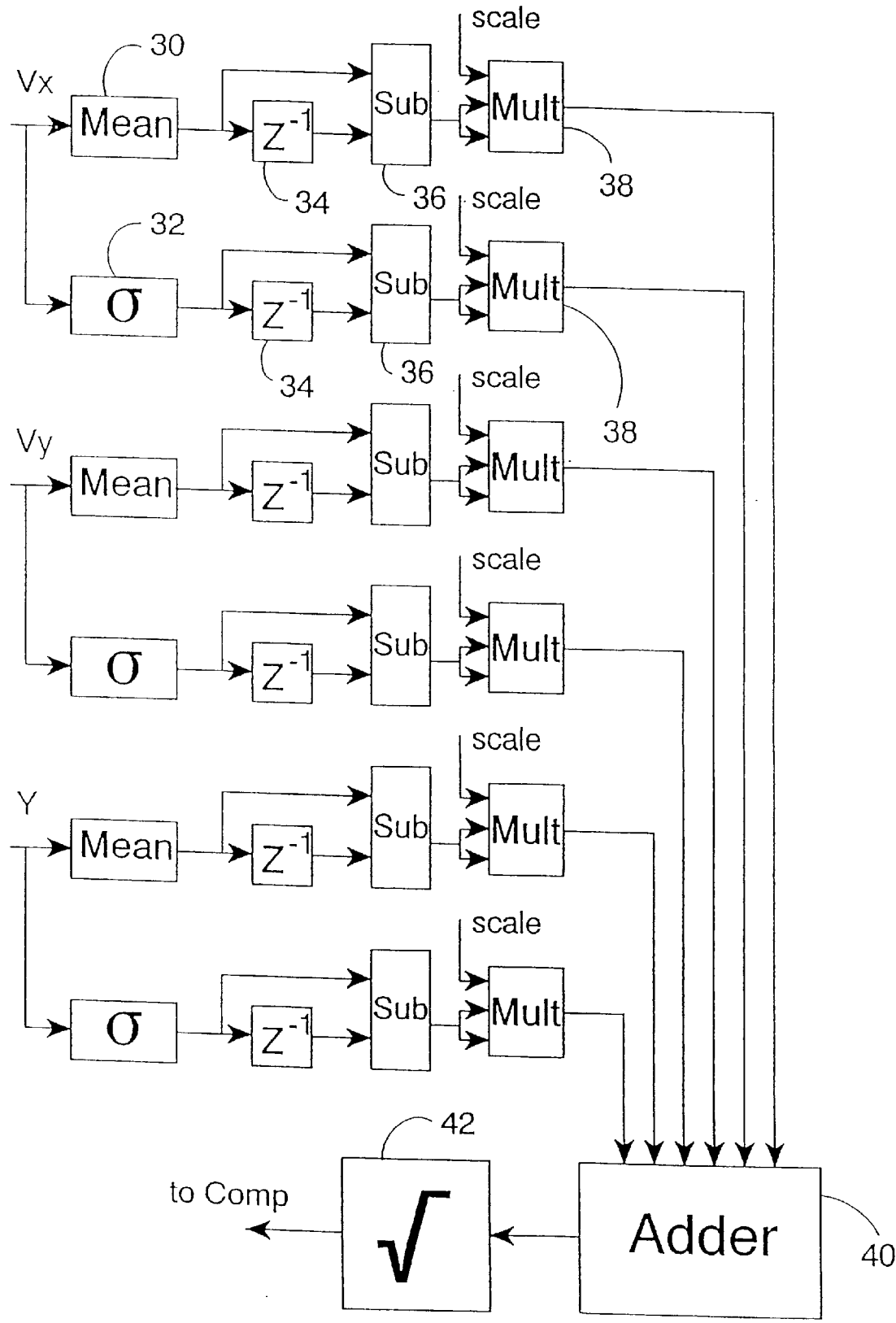
FIG. 9 illustrates in more detail an overall image characteristic signal determining circuit.

FIG. 9 illustrates the evaluating circuit 26 in more detail. The horizontal vector components ($V_x$) are supplied in parallel to a mean value determining circuit 30 and a standard deviation value determining circuit 32. The outputs of these respective circuits are then fed to delay elements 34 and subtracters 36 that serve to produce a differential of them between fields. The output of the subtracters 36 representing the rate of change of the statistical parameters are squared and subject to a scaling factor by three way multipliers 38.

In the same way that the horizontal vector components ($V_x$) are subject to the above processing, this also takes place for the vertical vector components ($V_y$) and the luminance signal (Y). The differentiated statistical values having been squared and scaled (using respective scaling values as appropriate) are together fed to an adder 40. The adder 40 sums all of its input signals and supplies its output to a square root determining circuit 42 whose output is in turn supplied to the comparator 28.

Figure 10:
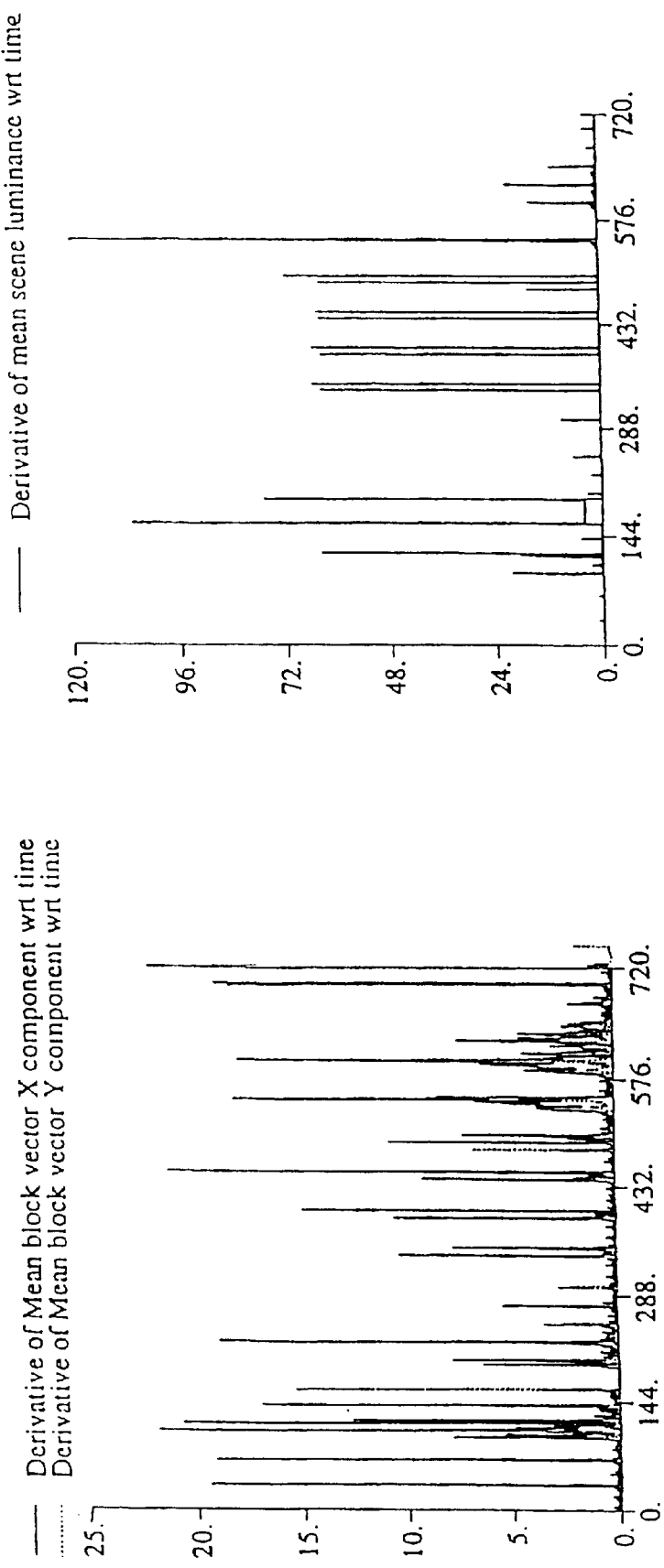
FIG. 10 illustrates the derivative of differing signal characteristics determined in accordance with the embodiment of FIG. 8.
Figure 11:
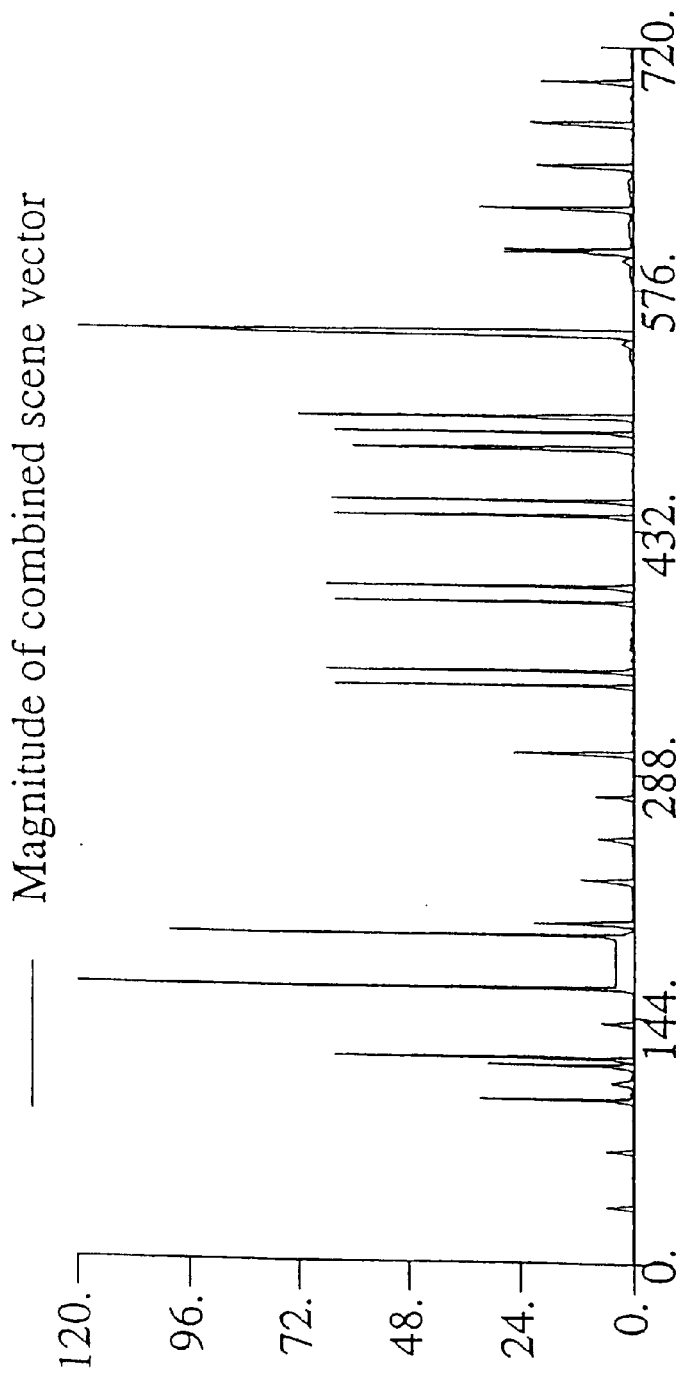
FIG. 11 illustrates a combined signal derived from those of FIG. 10.

FIG. 10 illustrates the derivatives of the mean values of the horizontal and vertical vector components as well as the derivative of the mean scene luminance. FIG. 11 illustrates the magnitude of a combined signal value taking account of the mean horizontal vector, the mean vertical vector, the mean scene luminance and the standard deviation of these signals. More particularly, each of these parameters is found, differentiated with respect to time, squared and then summed together (the luminance values being divided by 6 for scaling) to yield a summed value that is then square rooted. This particular mathematical combination has been found to produce reasonable results, but other mathematical parameters and indeed signal characteristics may be selected and analyzed.

Figure 12:
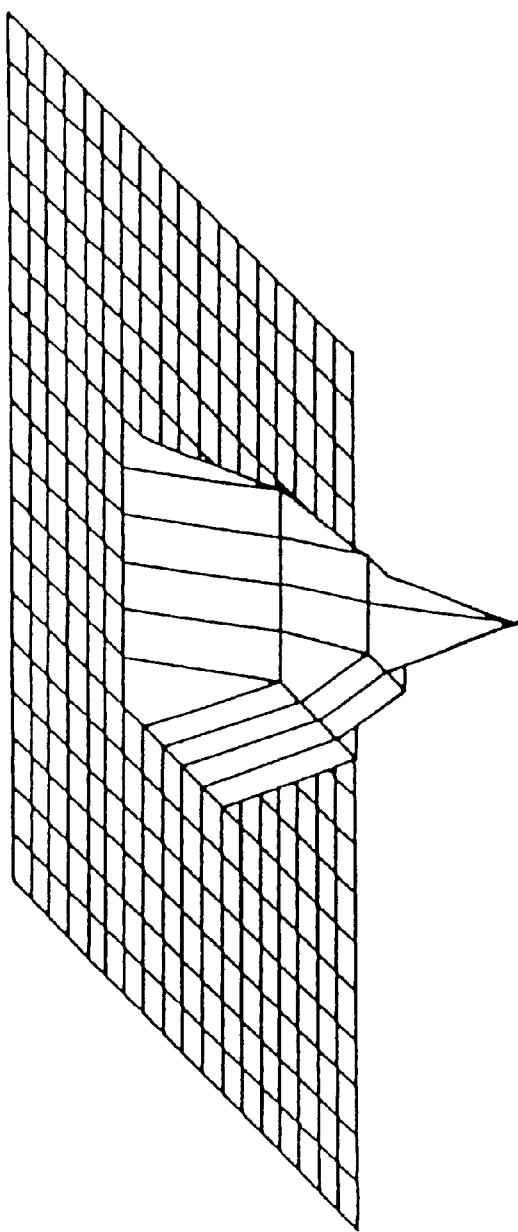
FIG. 12 illustrates a correlation surface.

FIG. 12 schematically illustrates a correlation surface. In this schematic illustration a minimum value of the surface represents a point of maximum correlation. It is the minimum values that are summed in the first embodiment discussed above.

If the images being analyzed are subject to only motion and no other changes, then accurate motion vectors may be determined. A characteristic of the correlation surfaces produced in such circumstances is that the peaks within them are narrow and high. Thus, a measure of the reliability of the motion vectors identified in a correlation surface may be made by determining the ratio of the depth of the correlation minimum point to the average value of the correlation surface. This is a relatively simple validity test and more sophisticated tests are known, but would be impractical in a scene change detector whose primary role is not to perform motion compensated processing.

Figure 13:
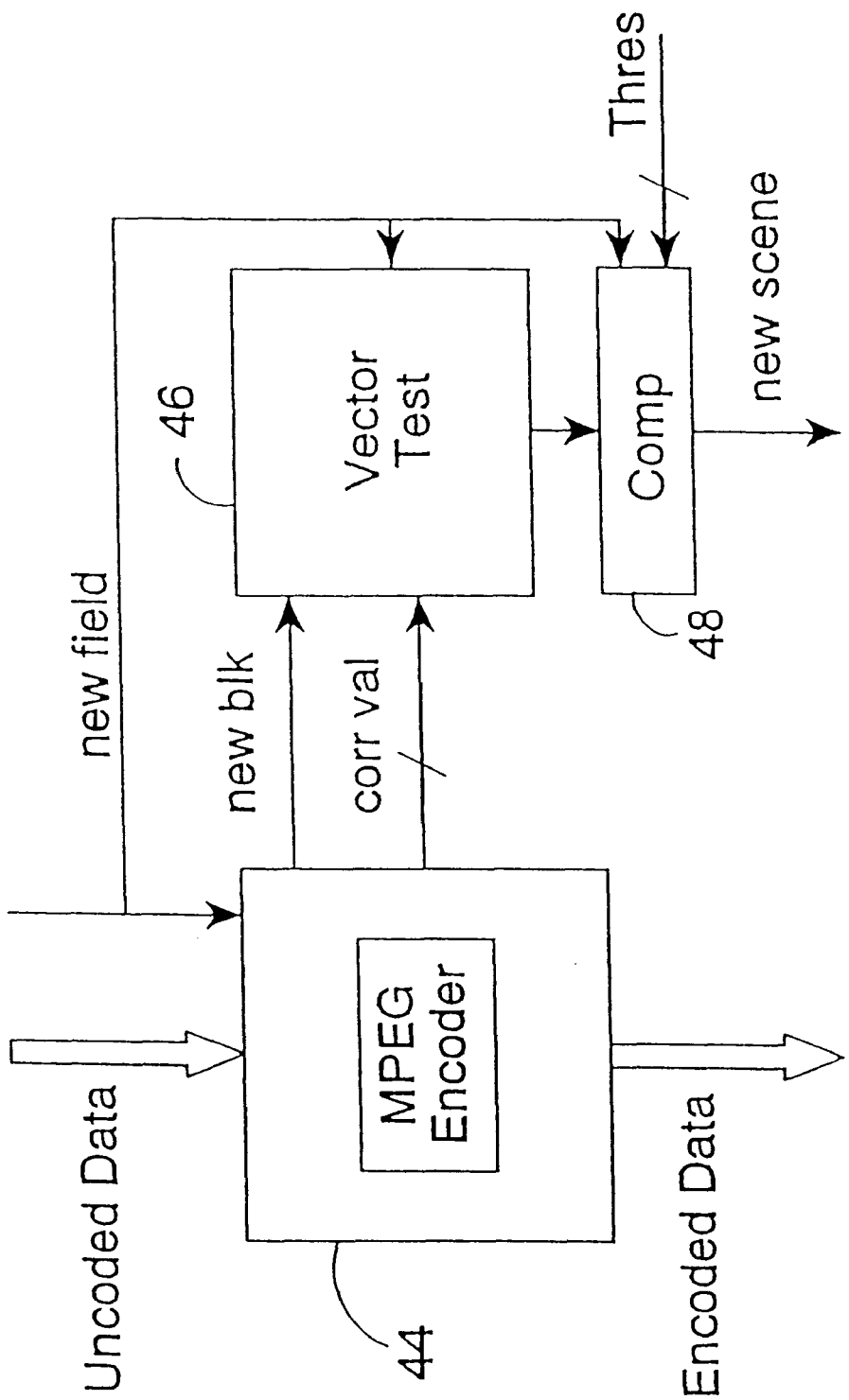
FIG. 13 illustrates a third embodiment of a scene change detector.

FIG. 13 illustrates an MPEG encoder 44 which in this case outputs the correlation values of the correlation surface as it is generated together with a signal indicating when each new search block is reached. A vector testing circuit 46 analyses these signals and counts the number of valid vectors within the current image. The number of valid vectors is compared using a comparator 48 with a threshold value. If the number of valid vectors is less than the threshold value, then this indicates that there is poor correlation between the current image and the image with which it is being compared by the MPEG encoder and accordingly a new scene signal is generated.

Figure 14:
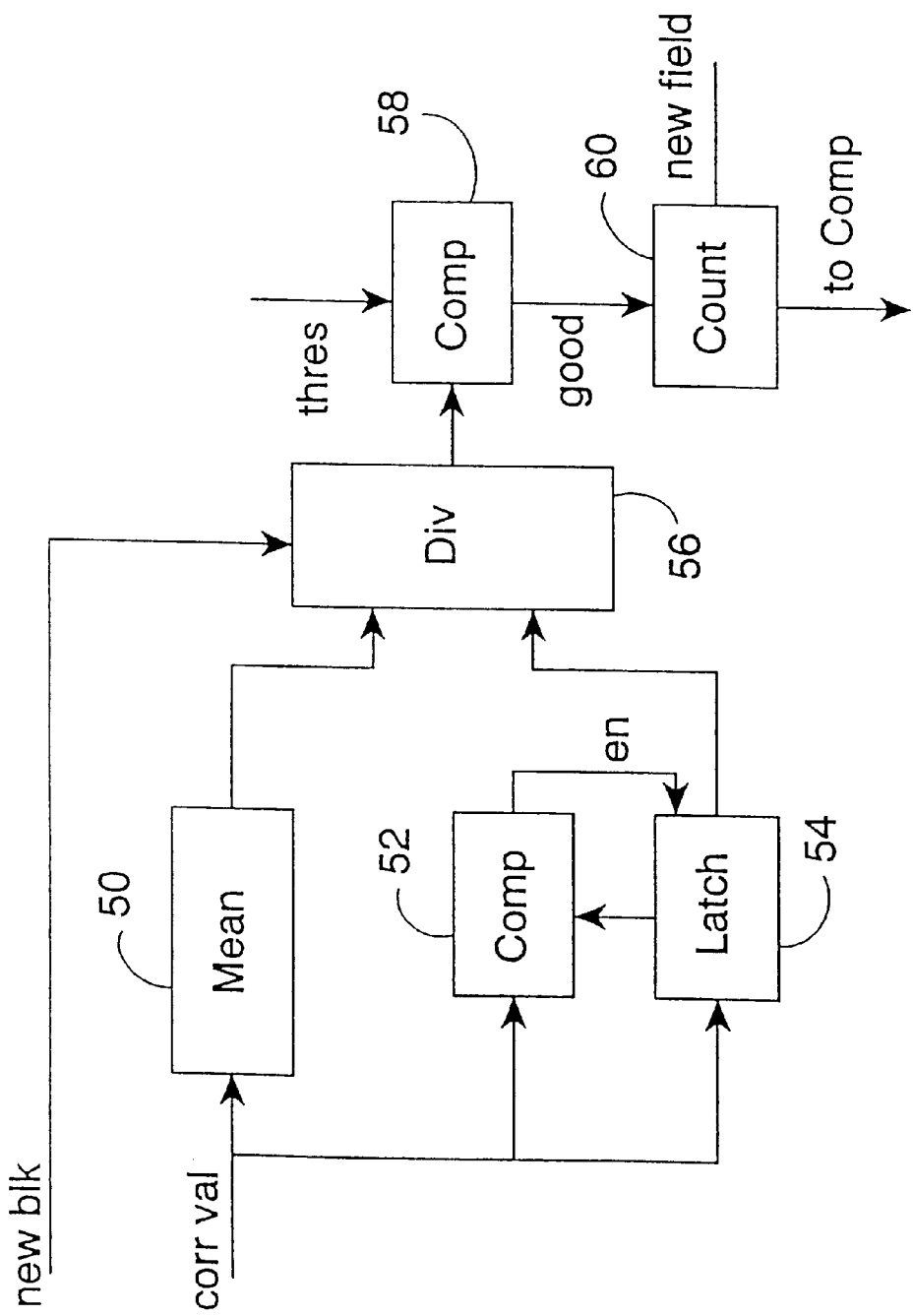
FIG. 14 illustrates a valid vector test circuit.

FIG. 14 illustrates the vector testing circuit 46 in more detail. The correlation values of the correlation surface are supplied in parallel to a mean value determining circuit 50, a comparator 52 and a latch 54. The mean value determining circuit 50 determines the mean value of the correlation surface value across each correlation surface as a whole (i.e. between new block signals). The comparator 52 and the latch 54 together serve to record the lowest value within the correlation surface. At the end of each correlation surface, a divider 56 determines the ratio of the correlation surface minimum to its mean value and outputs this to a comparator 58. This ratio is compared to a predetermined ratio indicative of a valid vector and a good/bad vector signal generated accordingly. The number of good vectors detected is counted by a counter 60 and at the end of the current image this value is output to the comparator 48.

Figure 15:
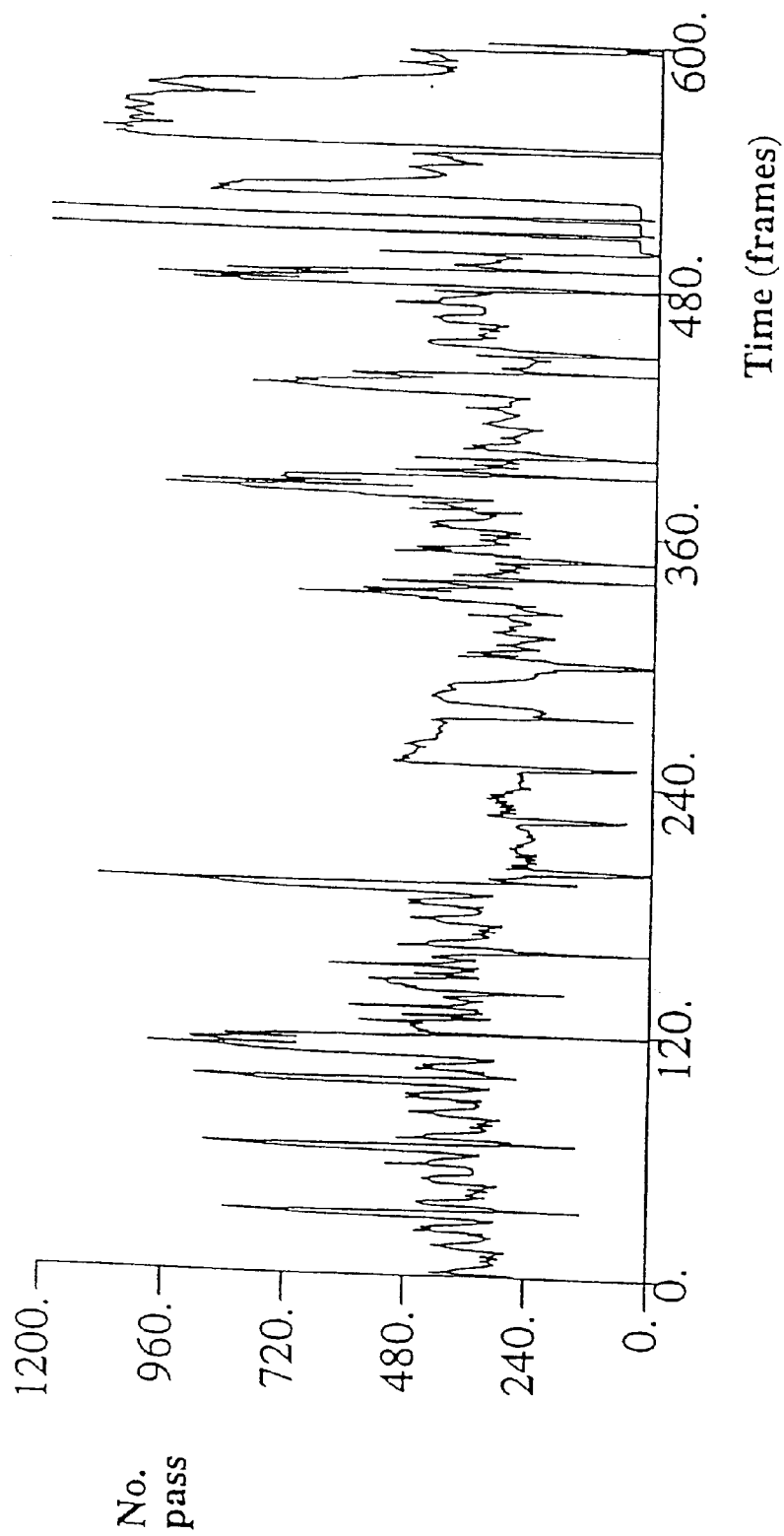
FIG. 15 illustrates the results of the application of the embodiment of FIGS. 13 and 14 to a sequence of images.

FIG. 15 illustrates the number of valid vectors for a sequence of image frames. The peaks in these results represent scene changes that may be detected using a thresholding test.

Whilst the above three embodiments have been separately described, it will be appreciated that they may be synergistically combined to provide more reliable scene detection.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I Claim:

1. Apparatus for detecting a scene change in a sequence of images, said apparatus comprising:
   (i) a correlation surface calculating circuit for calculating a plurality of correlation surfaces, each correlation surface representing image correlation between a search block of image data within a current image and portions of a temporally adjacent image displaced by differing displacement vectors from said search block;
   (ii) a correlation maximum detecting circuit responsive to said correlation surfaces calculated by said correlation surface calculating circuit for identifying correlation maximum points within said correlation surfaces corresponding to maximum image correlation between current image and said temporally adjacent image;
   (iii) an image correlation quality circuit responsive to correlation values indicative of correlation associated with said correlation maximum points for said current image for generating an image correlation quality value indicative of the degree of correlation between said current image and said temporally adjacent image; and
   (iv) a comparator for comparing said image correlation quality value with a predetermined threshold value to generate a scene change signal in response to said image correlation quality value being indicative of less correlation between said current image and said adjacent image than represented by said threshold value.

2. Apparatus as claimed in claim 1, wherein said image correlation quality circuit comprises a mean value circuit for determining a mean value of said correlation values for said correlation maximum points for said current image, said image correlation quality value being determined in dependence upon said mean value.

3. Apparatus as claimed in claim 1, wherein said image correlation quality circuit comprises a median value circuit that determines a median value of said image correlation quality values determined for a group of images surrounding said current image, said median value being subtracted from said image correlation quality value for said current image to yield a median corrected value, said median corrected value then being used as said image correlation quality value for said current image.

4. Apparatus as claimed in claim 1, wherein said image correlation quality circuit comprises a differentiating circuit that differentiates said image correlation quality value to yield a differentiated value, said differentiated value then being used as said image correlation quality value.

5. Apparatus as claimed in claim 1 comprising a video image library for which said scene change signals are used to generate markers for scene changes within video image material stored in said video image library.

6. A method of detecting a scene change in a sequence of images, said method comprising the steps of:

(i) calculating a plurality of correlation surfaces, each correlation surface representing image correlation between a search block of image data within a current image and portions of a temporally adjacent image displaced by differing displacement vectors from said search block;

(ii) identifying correlation maximum points within said correlation surfaces corresponding to maximum image correlation between current image and said temporally adjacent image;

(iii) in response to correlation values indicative of correlation associated with said correlation maximum points for said current image, generating an image correlation quality value indicative of the degree of correlation between said current image and said temporally adjacent image; and (iv) comparing said image correlation quality value with a predetermined threshold value to generate a scene change signal in response to said image correlation quality value being indicative of less correlation between said current image and said adjacent image than represented by said threshold value.

* * * * *